US011002205B2

United States Patent
Kominkiewicz et al.

(10) Patent No.: US 11,002,205 B2
(45) Date of Patent: May 11, 2021

(54) REGENERATION CONTROL SYSTEM FOR OXIDATION CATALYST REGENERATION IN INTERNAL COMBUSTION ENGINE

(71) Applicant: Caterpillar Inc., Deerfield, IL (US)

(72) Inventors: Ryan Kominkiewicz, Morton, IL (US); Brock Davis, Washington, IL (US); James Mutti, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 2 days.

(21) Appl. No.: 16/518,537

(22) Filed: Jul. 22, 2019

(65) Prior Publication Data

US 2021/0025344 A1    Jan. 28, 2021

(51) Int. Cl.
| | | |
|---|---|---|
| *F02D 41/02* | (2006.01) | |
| *F02D 41/00* | (2006.01) | |
| *F02D 41/14* | (2006.01) | |

(52) U.S. Cl.
CPC ....... *F02D 41/027* (2013.01); *F02D 41/0055* (2013.01); *F02D 41/024* (2013.01); *F02D 41/1439* (2013.01)

(58) Field of Classification Search
CPC .... F02D 41/027; F02D 41/055; F02D 41/024; F02D 41/1439; F01N 9/002; F01N 3/20; F01N 5/04; F01N 3/00; F01N 3/10; F02B 37/16; F02B 37/24; F02B 37/103; F02M 26/05
USPC ....... 60/274, 280, 285, 295, 297, 611, 605.1
See application file for complete search history.

(56) References Cited

U.S. PATENT DOCUMENTS

| | | | |
|---|---|---|---|
| 6,907,862 B2 | 6/2005 | Kitahara | |
| 6,962,045 B2 | 11/2005 | Kitahara et al. | |
| 7,080,511 B1* | 7/2006 | Bolton | F02D 41/0275 60/611 |
| 7,854,114 B2 | 12/2010 | England | |
| 8,011,179 B2 | 9/2011 | Scaife et al. | |
| 8,099,953 B2* | 1/2012 | DeHart | F01N 3/05 60/295 |
| 8,302,385 B2 | 11/2012 | Sujan | |
| 9,046,021 B2* | 6/2015 | DeGeorge | F01N 3/0253 |
| 9,115,644 B2* | 8/2015 | Bauer | F02B 37/166 |
| 10,054,068 B2* | 8/2018 | Mogavero | F02B 37/162 |

(Continued)

FOREIGN PATENT DOCUMENTS

| | | | | |
|---|---|---|---|---|
| CN | 110925061 | | 3/2020 | |
| EP | 1365125 A1 * | | 11/2003 | ........... F02D 41/029 |

(Continued)

*Primary Examiner* — Thai Ba Trieu

(74) *Attorney, Agent, or Firm* — Brannon Sowers & Cracraft

(57) ABSTRACT

A regeneration control system for an oxidation catalyst in an internal combustion engine includes a temperature sensor to produce a temperature signal indicative of an exhaust inlet temperature that is below a regeneration temperature for accumulated hydrocarbons on the oxidation catalyst, an electrically actuated boost leakage valve, and a regeneration control unit. The regeneration control unit commands an adjustment to the position of the electrically actuated boost leakage valve to increase leaked boost to increase exhaust temperature to the regeneration temperature by way of increased air-fuel ratio. Related methodology is disclosed.

17 Claims, 3 Drawing Sheets

(56) References Cited

U.S. PATENT DOCUMENTS

| | | | |
|---|---|---|---|
| 2003/0114978 A1* | 6/2003 | Rimnac | F02D 41/005 701/108 |
| 2009/0271094 A1* | 10/2009 | Stablein | F02D 41/0052 60/600 |
| 2010/0043428 A1* | 2/2010 | Stablein | F02D 41/025 60/611 |
| 2011/0120123 A1 | 5/2011 | Dickerson | |
| 2011/0146269 A1 | 6/2011 | Hepburn | |
| 2013/0108511 A1* | 5/2013 | Ide | F02D 41/029 422/109 |
| 2013/0167509 A1 | 7/2013 | Nishimura | |
| 2014/0157774 A1* | 6/2014 | McConville | F02B 37/164 60/611 |
| 2015/0135680 A1* | 5/2015 | Ancimer | F02D 41/027 60/274 |
| 2015/0143802 A1 | 5/2015 | Huhn et al. | |
| 2016/0084137 A1* | 3/2016 | Cunningham | F01N 3/103 60/297 |
| 2018/0028975 A1* | 2/2018 | Nagaoka | F01N 3/0814 |

FOREIGN PATENT DOCUMENTS

| | | | | |
|---|---|---|---|---|
| FR | 2907844 A1 * | 5/2008 | | F01N 3/22 |
| GB | 247618 A * | 2/1926 | | F02B 37/16 |
| GB | 2564833 A * | 1/2019 | | F02D 41/029 |
| WO | 2008041109 | 4/2008 | | |
| WO | 2013001311 | 1/2013 | | |
| WO | WO-2017105525 A1 * | 6/2017 | | F02B 37/168 |

* cited by examiner

REGENERATION CONTROL SYSTEM FOR OXIDATION CATALYST REGENERATION IN INTERNAL COMBUSTION ENGINE

TECHNICAL FIELD

The present disclosure relates generally to regenerating an oxidation catalyst (DOC) in an exhaust system, and more particularly to increasing exhaust temperature of an internal combustion engine to a regeneration temperature for the DOC by selectively leaking boost to increase air-fuel ratio (AFR).

BACKGROUND

Internal combustion engines are used throughout the world in a great range of environments different in temperature, humidity, and even altitude, and are operated across the spectrums of load, speed, and duty cycle. Internal combustion engines used in higher-temperature environments are often optimized in various ways differently from those used in colder-temperature environments. Varying ambient conditions can also affect engine operation, and therefore engines are typically equipped with various controls to accommodate changing conditions so that goals such as efficiency, productivity, and emissions can still be met.

Despite sophisticated engineering of engines and associated machinery, and implementation of advanced control strategies, circumstances can exist where conventional engine designs and operating or control strategies are not ideally suited to present conditions. For instance, it has been observed that at idle conditions, particularly with low parasitic loads, engine combustion can be somewhat incomplete due to the relatively small amounts of fuel that are injected. Coupled with relatively cold inlet air temperatures, combustion quality can be reduced even further such that during extended periods of idling, exhaust and other system parameters may not be optimally managed. Certain aspects of modern emissions mitigation systems for engines require catalyst activation temperatures that may be greater than exhaust temperatures produced by the engine under such conditions, potentially leading to undesired output of certain exhaust constituents or requiring other mechanisms for emissions capture or treatment. In some instances, engine speed can be increased during extended periods of idling to produce somewhat elevated exhaust temperatures, however, such an approach has the downside of requiring burning more fuel than what might otherwise be necessary. One strategy for selectively controlling exhaust temperatures is set forth in United States Patent Application Publication No. 20150143802AI.

SUMMARY OF THE INVENTION

In one aspect, a regeneration control system for an oxidation catalyst (DOC) in an exhaust system for an internal combustion engine includes a temperature sensor structured to produce a temperature signal indicative of an exhaust inlet temperature of the DOC that is below a regeneration temperature for accumulated hydrocarbons on the DOC. The regeneration control system further includes an electrically actuated boost leakage valve movable between a closed position and an open position to vary an amount of boost leaked from an intake conduit for the internal combustion engine. The regeneration control system still further includes a regeneration control unit coupled with the temperature sensor and the electrically actuated boost leakage valve. The regeneration control unit is structured to command, based on the temperature signal, an adjustment to the position of the electrically actuated boost leakage valve to increase the amount of leaked boost, and increase an exhaust temperature of the internal combustion engine to the regeneration temperature, based on an increased air-fuel ratio (AFR) produced in response to the commanded adjustment to the position of the electrically actuated boost leakage valve.

In another aspect, an internal combustion engine system includes an exhaust system having an exhaust inlet, an exhaust outlet, and an oxidation catalyst (DOC) positioned fluidly between the exhaust inlet and the exhaust outlet. The engine system further includes a boost leakage valve structured to vary an amount of leaked boost, and a control system. The control system includes a temperature sensor structured to produce a temperature signal indicative of an exhaust inlet temperature of the DOC, and a regeneration control unit coupled with the temperature sensor. The regeneration control unit is structured to command an adjustment to a position of the boost leakage valve to increase an amount of the leaked boost, based on the temperature signal, and to increase an exhaust temperature in the internal combustion engine system to a regeneration temperature of the DOC based on an increase in an air-fuel ratio (AFR) produced in response to the commanded adjustment to the position of the boost leakage valve.

In still another aspect, a method of regenerating an oxidation catalyst (DOC) in an exhaust system of an internal combustion engine includes producing a temperature signal indicative of an exhaust inlet temperature of the DOC that is below a regeneration temperature for accumulated hydrocarbons on the DOC. The method further includes commanding an adjustment to a position of a boost leakage valve of the internal combustion engine, and increasing an exhaust temperature of the internal combustion engine to the regeneration temperature based on an increase in an air-fuel ratio (AFR) produced by the commanded adjustment to the position of the boost leakage valve.

DETAILED DESCRIPTION

Figure 1:
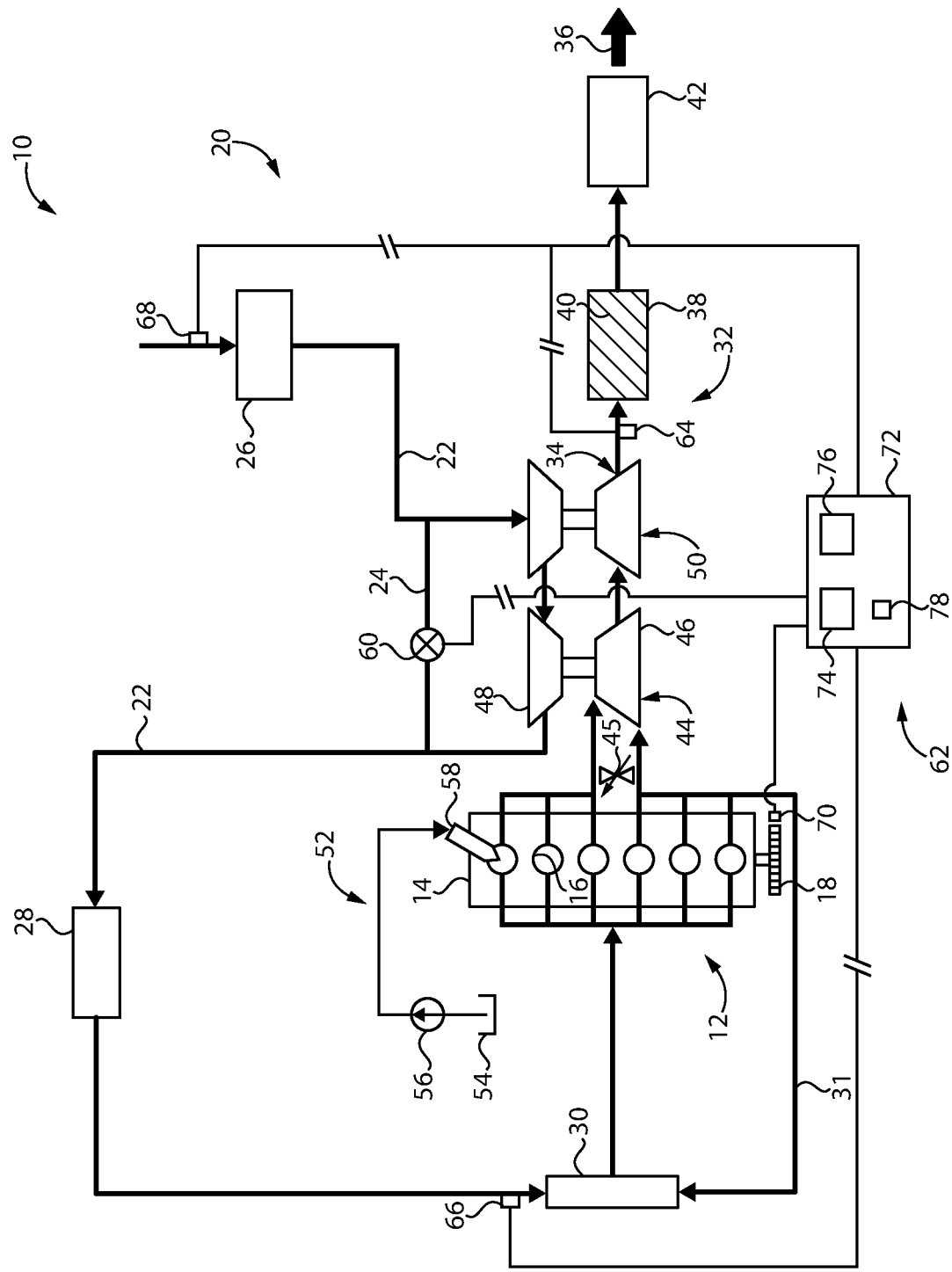
FIG. 1 is a diagrammatic view of an internal combustion engine system, according to one embodiment.

Referring to FIG. 1, there is shown an internal combustion engine system 10 according to one embodiment, and including an internal combustion engine 12 (hereinafter "engine 12") having an engine housing 14 with a plurality of cylinders 16 formed therein. A plurality of pistons are positioned one within each of cylinders 16 and structured to reciprocate in response to combustion of a fuel and air to rotate a crankshaft, coupled with an engine flywheel 18, in a generally conventional manner. Engine 12 can include a compression ignition diesel engine, however, the present disclosure is not thereby limited. Cylinders 16 can include any number of cylinders in any suitable arrangement. Internal combustion engine system 10 (hereinafter "engine system 10") also includes an intake system 20 having an intake conduit 22 structured to provide intake air for combustion with fuel in engine 12. Intake system 20 also includes a boost recirculation conduit 24, connecting between an upstream location and a downstream location to intake conduit 22, the significance of which will be further apparent from the following description. Air supplied into intake system 20 may pass through an air filter 26 or the like, and thenceforth through one or more turbochargers 50 and 44. Turbocharger 44 includes a compressor 48 coupled with a turbine 46. Turbocharger 50 may be analogously configured. Intake air compressed in turbochargers 50 and 44 may be cooled in a charge air cooler (CAC) 28, for supplying to cylinders 16. Engine system 12 can be further equipped with an exhaust gas recirculation conduit 31, and a mixer 30 that mixes recirculated exhaust gas with the intake air for supplying to cylinders 16. Engine system 10 also includes a fuel system 52 including a fuel supply or tank 54, and one or more fuel pumps 56 structured to convey a liquid fuel from fuel tank 54 to engine 12 for delivery into cylinders 16. In the illustrated embodiment, fuel system 52 includes a fuel injector 58 positioned to inject the liquid fuel directly into one of cylinders 16. Engine 12 would be equipped with additional fuel injectors, however, only one fuel injector is shown for clarity of illustration. In other embodiments, engine 12 could be port injected with a liquid fuel such as diesel distillate fuel, operated using premixed or directly injected gasoline, a gaseous fuel such as natural gas, or potentially configured as a dual fuel engine operating on both a gaseous fuel and a liquid fuel.

Engine system 10 further includes an exhaust system 32 structured to receive exhaust from engine 12, with the exhaust used to operate turbochargers 44 and 50 in a generally known manner, and then conveyed downstream from turbochargers 44 and 50 for exhaust aftertreatment. Exhaust system 32 includes an exhaust inlet 34, an exhaust outlet 36, and an oxidation catalyst 40 within an aftertreatment module 38. A turbocharger balance valve is shown at reference numeral 45. Oxidation catalyst 40 can include any of a variety of precious metal catalysts, or potentially base metal catalysts or still others, and is structured to perform known functions of oxidizing unburned hydrocarbons in exhaust from engine 12 as well as oxidizing oxides of nitrogen (NOx) for purposes that will be familiar to those skilled in the art. Oxidation catalyst 40 is referred to herein as a diesel oxidation catalyst or "DOC," however, it should be appreciated that the term "DOC" is used in an illustrative sense and is not limiting with regard to the types of fuel with which engine 12 can be operated. An additional aftertreatment module 42 is shown positioned fluidly downstream of aftertreatment module 38, and could include a NOx reduction catalyst, such as a selective catalytic reduction (SCR) catalyst. Under certain operating conditions such as extended periods of idling with low parasitic loads, particularly in relatively cold ambient conditions, unburned hydrocarbons (HC) can accumulate on or in DOC 40. Where exhaust temperatures are relatively low, the exhaust from engine 12 may be cooler than a catalytic activation temperature of the precious metal or other catalysts of DOC 40, in other words a regeneration temperature for unburned hydrocarbons. As a result, unburned hydrocarbons can fail to be oxidized, or oxidized too slowly to be optimally treated and disposed of, creating the possibility of an exothermic reaction or "exotherm" in aftertreatment module 38. As will be further apparent from the following description, engine system 10 is equipped with various control apparatus, logic, and methodology to selectively regenerate DOC 40 using transiently elevated exhaust temperatures.

Engine system 10 and exhaust system 32 further include a boost leakage valve 60 positioned in boost recirculation conduit 24 and movable between a closed position and an open position to vary an amount of boost leaked from intake conduit 22. Boost leakage valve 60 will typically be electrically actuated, such as by way of a solenoid electrical actuator, and can have its position varied to adjust the amount of leaked boost from a zero amount to a non-zero amount. As used herein, the term "boost" refers to compressed air, although other constituents are not excluded depending upon the engine system design. It should also be appreciated that the leaked boost will typically be recirculated from a downstream location to an upstream location in intake conduit 22, and thus returned to turbochargers 50 and 44, however, in other instances the leaked boost could be discharged, or injected into exhaust system 32, or used for various other purposes such as charging an on-board supply of compressed air.

Leaking boost can have the effect of increasing air-fuel ratio (AFR), effectively causing engine 12 to operate relatively richer with respect to fuel, and thereby producing elevated exhaust temperatures over what might be otherwise observed. As suggested above, the present disclosure contemplates exploiting the available leakage of boost to increase exhaust temperature sufficiently to reach a regeneration temperature for accumulated hydrocarbons on DOC 40. Engine system 10 also includes a regeneration control system 62 having a temperature sensor 64 structured to produce a temperature signal indicative of an exhaust inlet temperature of DOC 40. Control system 62 can also include a second temperature sensor 66 that produces a second temperature signal, indirectly indicative of an exhaust inlet temperature of DOC 40 and/or indicative of other temperature parameters in engine system 10 such as charge air and thus ambient temperatures. Sensing of exhaust inlet temperature directly could be used as the sole indicator of exhaust inlet temperatures at DOC 40, and used as the basis for triggering boost leakage or other thermal management actions as discussed herein. Control system 62 could also take account of temperature indicated by temperature sensor 66, separately or in combination with the temperature indicated by temperature 64, or other direct or indirect temperature measurements. Control system 62 may also include an inlet air temperature sensor 68 structured to sense a temperature of ambient incoming air. Control system 62 can further include an engine speed sensor 70, coupled with flywheel 18 for example, to monitor engine speed and commanded increases or decreases in engine speed as further discussed herein.

Control system 62 still further includes a regeneration control unit 72 coupled with each of sensors 64, 66, 68, 70, and potentially still other sensors. Regeneration control unit 72 may be in control communication with boost leakage valve 60 to vary position of boost leakage valve 60 as discussed herein. Regeneration control unit 72 may also be in control communication with fuel injector 58, for example, to vary fueling of engine 12 as a means of controlling engine speed. In other engine architectures and/or operating strategies, engine speed could be controlled in a different manner such as by varying a throttle position. Regeneration control unit 72 can be, or be coupled with, an engine control unit (ECU) that monitors and/or controls any of a great number of different engine parameters, or could be structured as a plurality of control units each performing different logic operations on different targets. Regeneration control unit 72 includes a computerized data processor 74, including any suitable central processing unit, and a computer readable memory 76 such as RAM, ROM, DRAM, SDRAM, FLASH, or still another. Memory 76 stores computer executable program instructions that can be executed by data processor 74 to control regeneration of DOC 40 as further discussed herein. Regeneration control unit 72 may also include a timer 78, also further discussed herein.

Regeneration control unit 72 is structured to command an adjustment to a position of boost leakage valve 60 to increase an amount of leaked boost, based on the temperature signal. It will be recalled that the temperature signal could be a temperature signal produced by temperature sensor 64, temperature sensor 66, or by both temperature sensors 64, 66, or potentially still other temperature sensors in engine system 10. Regeneration control unit 72 is further structured to increase an exhaust temperature of engine 12 to the regeneration temperature for accumulated hydrocarbons on DOC 40, based on an increase in AFR produced in response to the commanded adjustment to the position of boost leakage valve 60. Regeneration control unit 70 may also be structured to increment timer 78, and to decrement timer 78 under certain conditions. Incrementing of timer 78 may be performed at a counting speed that varies inversely with exhaust inlet temperature indicated by the temperature signal. Regeneration control unit 72 may be further structured to command the adjustment to the position of boost leakage valve 60 based on a count of timer 78.

Under certain conditions, such as extended periods of idling at low ambient temperatures, where it is desirable to controllably regenerate DOC 40 to prevent an exotherm based on combustion of accumulated unburned hydrocarbons, regeneration control unit 72 may start timer 78. Timer 78 can be a so-called smart timer that functions as a counter, and in some embodiments at a counting speed that will be faster the colder exhaust inlet temperatures at DOC 40 are. In other words, timer 78 may be incremented faster when exhaust inlet temperatures are colder, incremented slower when they are warmer, and decremented when exhaust inlet temperatures are warmer still, such as where exhaust inlet temperature is at or above the regeneration temperature for accumulated hydrocarbons. Regeneration control unit 72 can exploit the varied counting speed of timer 78 to regenerate at different regeneration frequencies and potentially according to different patterns or means of regeneration as further discussed herein.

INDUSTRIAL APPLICABILITY

As discussed herein, at idle conditions with low parasitic loads, engine combustion can be incomplete due to the relatively small amounts of fuel injected into the engine cylinders. Colder inlet manifold air temperatures can reduce combustion quality further, such that during extended periods of idling the incomplete combustion can lead to undesired amounts of unburned hydrocarbons accumulating. Accumulation of the unburned hydrocarbons on the surface of the DOC could potentially result in an exotherm directly on the catalyst substrate/washcoat when the engine is loaded again, and exhaust temperatures rise above the lightoff temperature of the unburned hydrocarbons. The extent of the exotherm can depend on the amount of hydrocarbon deposited on the catalyst, which may be directly proportional to the amount of time the engine is idling at low loads. An exotherm can cause thermal deterioration of the catalyst washcoat such as by sintering of washcoat and precious metal, and possibly even reach temperatures high enough to melt the ceramic or metallic substrates. The present disclosure enables controlled boost leakage for hydrocarbon evaporation regeneration, such that the unburned hydrocarbons can be selectively oxidized by way of temporarily raised exhaust temperatures to regenerate the DOC. Other regeneration strategies directed to other types of catalyst degradation, such as sulfur poisoning, could be used in parallel or in conjunction with the present strategies, and might include raising exhaust temperatures above the regeneration temperature for accumulated hydrocarbons.

Figure 2:
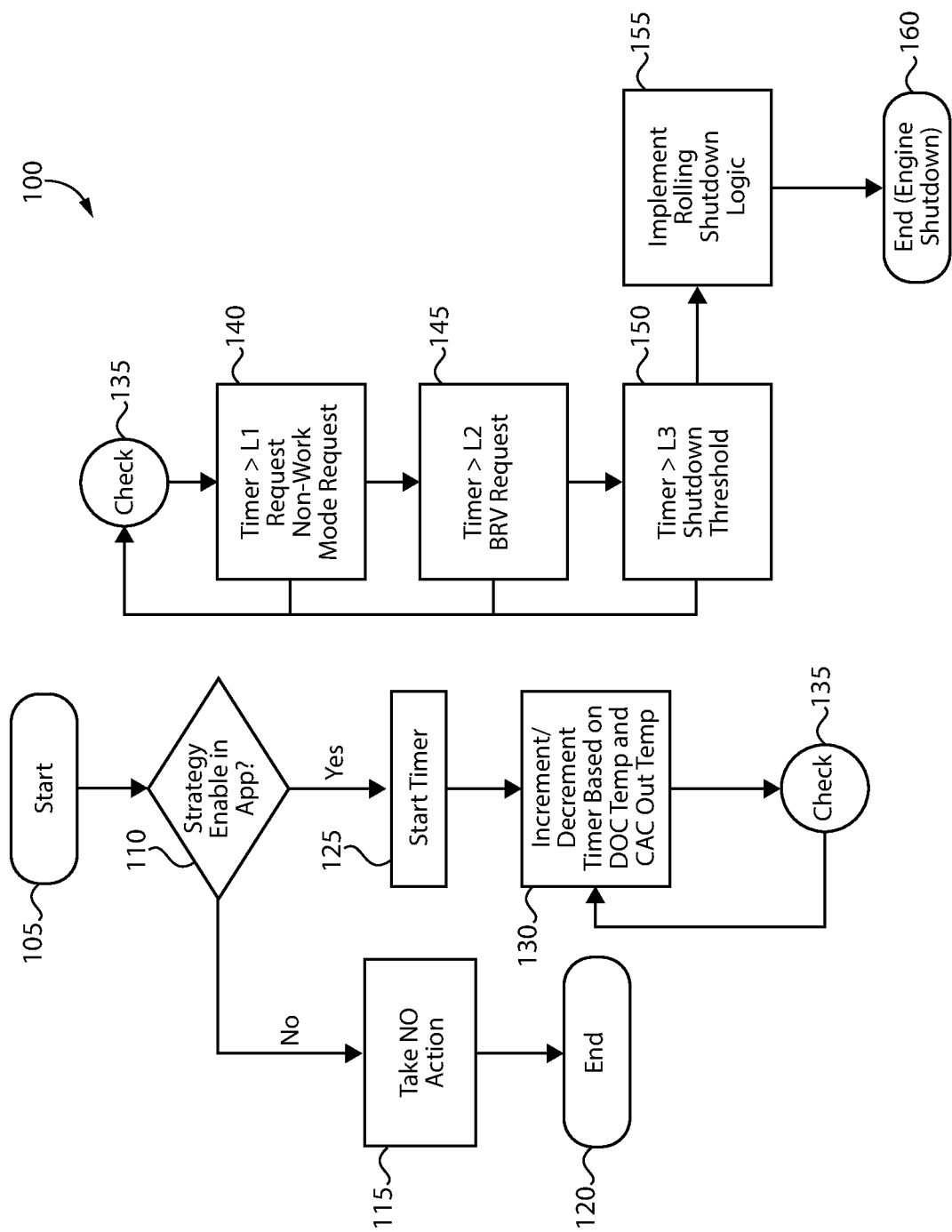
FIG. 2 is a flowchart illustrating methodology and control logic flow, according to one embodiment.

Turning now to FIG. 2, there is shown a flowchart 100 illustrating further example methodology and logic flow according to the present disclosure. In flowchart 100, a start or initialize block is shown at 105, from which the logic can advance to a block 110 to determine whether the controlled boost leakage control strategy is enabled. If no, the logic can advance to a block 115 to take no action, and then to end at a block 120. If the strategy is enabled at block 110, the logic can advance to a block 125 where regeneration control unit 72 starts timer 78. Timer 78 can include control circuitry on regeneration control unit 72, but in other embodiments could include a separate electronic timer. From block 125, the logic can advance to a block 130 to increment/decrement timer 78 based on DOC temp and CAC-out temp. It will be recalled that temperature sensor 64 produces a temperature signal indicative of an exhaust inlet temperature of DOC 40. In the case of an exhaust inlet temperature below a regeneration temperature for accumulated hydrocarbons on DOC 40, timer 78 may be incremented. It will also be recalled that regeneration control unit 72 can increment timer 78 at a counting speed that is based on the exhaust inlet temperature indicated by the temperature signal, and in some embodiments at a counting speed that varies based on the exhaust inlet temperature. Another way to understand this principle is that timer 78 counts faster where exhaust inlet temperature is colder, and counts slower where exhaust inlet temperature is warmer. The counting speed may thus be understood to vary inversely with exhaust inlet temperature. Where exhaust inlet temperature is above the regeneration temperature for accumulated hydrocarbons, regeneration control unit 72 may decrement timer 78. It will also be recalled that incrementing and decrementing timer 78 can be based on CAC outlet temperature, such as based on a second temperature signal produced by temperature sensor 66. The temperature of intake air downstream of charge air cooler or CAC 28 can be indicative of ambient temperatures, which if low enough can be associated with a risk of icing in the intake manifold or other parts of intake system 20, or still other undesired conditions or risks. Where a risk of such icing is determined, for example, controlled boost leakage and/or increased engine speed can be used to increase temperatures sufficiently to address the potential problem.

From block 130 the logic can advance to a block 135 where a check can be performed whereby regeneration control unit 72 allocates, based on a count of timer 78, a burden of increasing exhaust temperature to the regeneration temperature between the increase in the amount of leaked boost and an increased engine speed. It will be appreciated that increasing engine speed can increase exhaust inlet temperature at DOC 40 instead of, or in cooperation with, increasing of exhaust temperature by controlled boost leakage. Regeneration control unit 72 can determine whether a count of timer 78 satisfies certain thresholds to use increased engine speed, controlled boost leakage, or both, to increase exhaust inlet temperatures to the regeneration temperature. At a block 140 regeneration control unit 72 can determine a count of timer 78 satisfies a count threshold, in particular determining timer count is greater than L1, and responsively producing a non-work mode request. The non-work mode request can include commanding, based on the count of timer 78 and thus based on the temperature signal, an increased engine speed of internal combustion engine 12. In some instances, the increased engine speed may be sufficient to increase exhaust temperature of engine 12/system 10 to the regeneration temperature. At a block 145 regeneration control unit 72 can determine timer count is greater than an L2 threshold, and responsively produce a BRV (boost recirculation or leakage valve) request. The logic at block 145 can be understood to include determining the timer count is satisfying another count threshold that is higher than the count threshold determined to be satisfied at block 140. For purposes of understanding the description of count thresholds herein, the count threshold determined to be satisfied at block 145 can be a first count threshold, and the count threshold satisfied at block 140 can be a second count threshold, with the second count threshold being lower than the first count threshold. At a block 150 regeneration control unit 72 can determine timer count is greater than an L3 threshold, which can be a be a third count threshold or an engine shutdown threshold that is greater than the first count threshold. From block 150 the logic can advance to a block 155 to implement rolling shutdown logic, initiating engine shutdown according to a predetermined engine shutdown regime. Engine 10 might be shut down where the count of timer 18 is high enough (above L3 or the shutdown threshold) that an amount of accumulated hydrocarbons is sufficiently high that no logic-based intervention should be attempted, and instead an operator or technician may need to take some other corrective action. From block 155 the logic can advance to a block 160 to end at engine shutdown.

In general terms, it will be understood that regeneration control unit 72 is determining whether the count of timer 78 indicates that DOC regeneration can be achieved by way of commanding increased engine speed, achieved by way of controlled boost leakage, or whether instead the timer count is high enough to justify shutting down the engine. Still another way to understand these principles is that regeneration control unit 72 determines whether a relatively mild increase in exhaust temperatures might be achieved, and effective, by way of relatively modest intervention using increased engine speed alone, or whether more robust intervention by way of controlled boost leakage is justified. It should also be understood that in some instances increased engine speed and controlled boost leakage could be used together to increase exhaust inlet temperatures to the regeneration temperature. Increased engine speed might be used where the increase needed in exhaust inlet temperature is relatively modest and a fuel penalty from increased engine speed would be minor and thus acceptable. Since timer 78 can be incremented at a counting speed that varies based on exhaust inlet temperature, generally under colder conditions regeneration control unit 72 can recognize that unburned hydrocarbons are likely accumulating relatively faster, and under warmer conditions unburned hydrocarbons are accumulating relatively slower. Accordingly, the frequency of regeneration will tend to be greater under colder conditions and less under relatively warmer conditions, with the frequency depending upon how quickly timer 78 counts up to the various thresholds. Rather than two counting thresholds, in other embodiments a greater number of thresholds might be employed, with regeneration control unit 72 taking various different actions depending upon what threshold is satisfied. It is also contemplated that a single threshold for implementing corrective controls might be employed in some instances.

Figure 3:
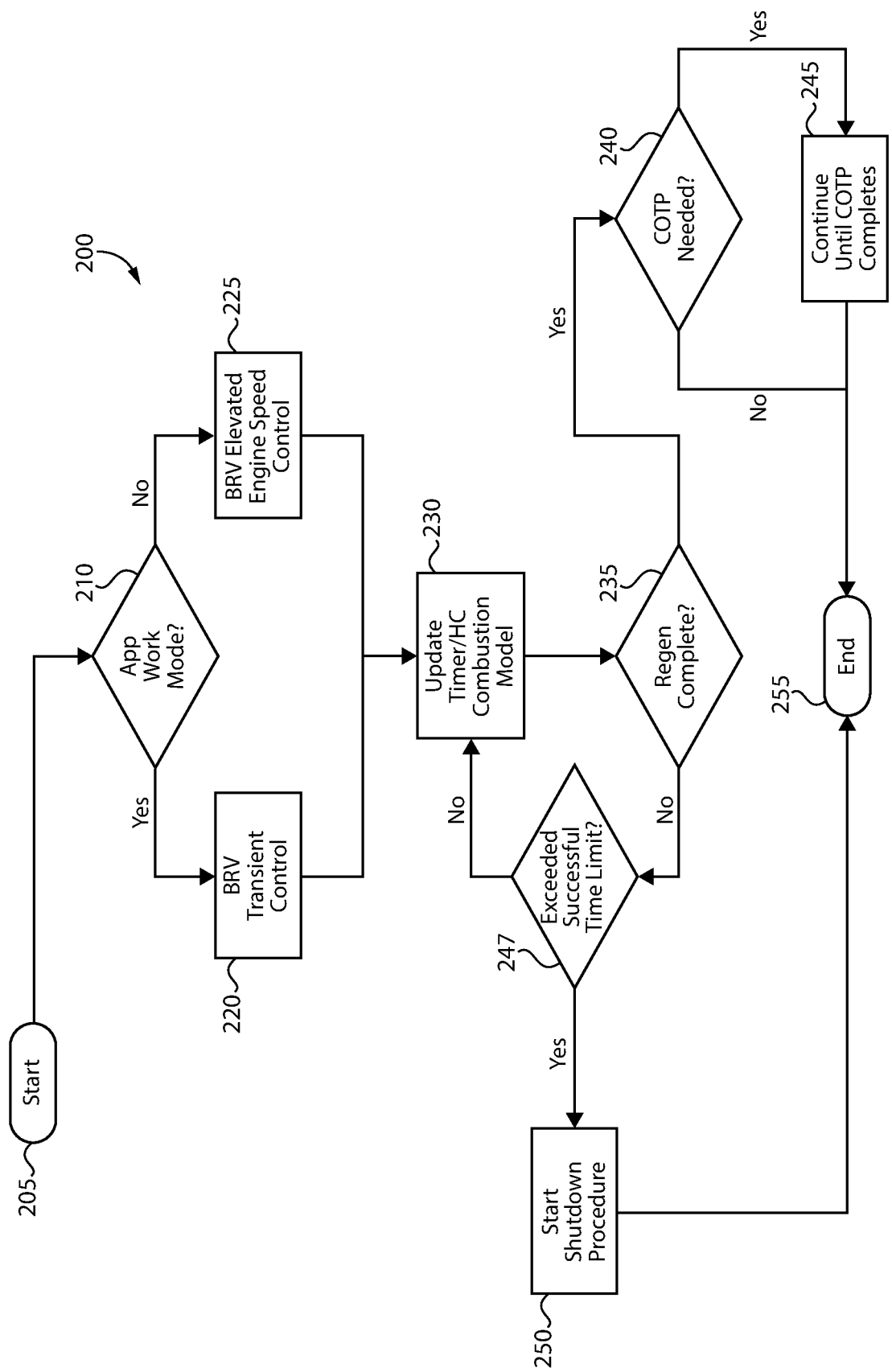
FIG. 3 is a flowchart illustrating methodology and control logic flow, according to one embodiment.

Turning now to FIG. 3, there are shown additional features of methodology and control logic flow in another flowchart 200. Flowchart 200 begins at a block 205, and can advance to a block 210 to determine whether application work mode is enabled. If yes, the logic can advance to a block 220 to implement BRV transient control, generally meaning that controlled boost leakage will be used to control exhaust inlet temperatures. If application work mode is not enabled at block 210, the logic can advance to a block 225 to employ BRV elevated engine speed control, where both increased or initiated boost leakage and increased engine speed can be used, whereas block 220 can be understood to represent using controlled boost leakage alone. From either block 220 or 225 the logic may advance to a block 230 to update timer/HC combustion model, and then to a block 235 to determine is regeneration complete? If regeneration is not complete at block 235 the process can advance to a block 247 to determine whether a successful time limit is exceeded. If no, the logic can return to block 230. If yes, the logic can advance to a block 250 to start engine shutdown procedure, and then to a block 255 to end. If regeneration is complete at block 235, the logic can advance to a block 240 to determine is COTP needed. COTP means charge air cooler-out temperature protection. If no, the logic can advance to block 255 to end. If yes, the logic can advance to a block 245 to continue until COTP completes. Block 245 can be understood to represent continued operation of engine system 10 with elevated engine speed or controlled boost leakage to ensure potential cold temperature operating problems such as an iced intake manifold are prevented.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A regeneration control system for an oxidation catalyst (DOC) in an exhaust system for an internal combustion engine comprising:
   a temperature sensor for measuring a temperature indicative of an instant exhaust inlet temperature of the DOC being below a regeneration temperature for accumulated hydrocarbons on the DOC;
   an electrically actuated boost leakage valve movable between a closed position and an open position to vary an amount of boost leaked from an intake conduit for the internal combustion engine;
   a timer; and
   a regeneration control unit including executable instructions stored on a memory to:
      adjust a position of the electrically actuated boost leakage valve to increase the amount of leaked boost based on the instant exhaust inlet temperature of the DOC;
      increase an exhaust temperature of the internal combustion engine to reach the regeneration temperature, based on an air-fuel ratio (AFR) that is relatively richer with respect to fuel and produced in response to the electrically actuated boost leakage valve having been adjusted;

increment the timer at a counting speed that is based on the instant exhaust inlet temperature; and adjust the position of the boost leakage valve based on a count of the timer.

2. The control system of claim 1 wherein the regeneration control unit further includes executable instructions stored on the memory to:

increase an engine speed of the internal combustion engine based on the instant exhaust inlet temperature; and increase the exhaust temperature of the internal combustion engine based on the increased engine speed.

3. The control system of claim 2 wherein the temperature sensor includes a DOC inlet temperature sensor.

4. The control system of claim 2 wherein the regeneration control unit further includes executable instructions stored on the memory to allocate, based on a count of the timer, a burden of increasing the exhaust temperature to reach the regeneration temperature between the increase in the amount of leaked boost and the increased engine speed.

5. The control system of claim 4 wherein the regeneration control unit further includes computer executable instructions stored on the memory to initiate engine shutdown where the count of the timer satisfies a shutdown count threshold.

6. An internal combustion engine system comprising:

an exhaust system including an exhaust inlet for connecting to an internal combustion engine, an exhaust outlet, and an oxidation catalyst (DOC) positioned fluidly between the exhaust inlet and the exhaust outlet;

a boost leakage valve for varying an amount of leaked boost in the internal combustion engine system;

a control system including a temperature sensor for measuring a temperature indicative of an instant exhaust inlet temperature of the DOC, a timer, and a regeneration control unit coupled with the temperature sensor and the timer, the regeneration control unit including executable instructions stored on a memory to:

adjust a position of the boost leakage valve to increase an amount of the leaked boost, based on the instant exhaust inlet temperature;

increase an exhaust temperature in the internal combustion engine system to reach a regeneration temperature of the DOC based on an air-fuel ratio (AFR) that is relatively richer with respect to fuel and produced in response to the commanded adjustment to the position of the boost leakage valve; and increment the timer at a counting speed that varies inversely with the instant exhaust inlet temperature, and adjust the position of the boost leakage valve based on a count of the timer.

7. The engine system of claim 6 further comprising an intake conduit, and a boost recirculation conduit fluidly connected to the intake conduit and having the boost leakage valve positioned therein.

8. The engine system of claim 7 wherein the boost recirculation conduit fluidly connects to the intake conduit at a boost leakage location that is downstream of the compressor, and fluidly connects to the intake conduit at a recirculated boost return location at upstream of compressor.

9. The engine system of claim 7 wherein the temperature sensor includes a DOC inlet temperature sensor, and further comprising a charge air cooler (CAC) within the intake conduit, and an additional temperature sensor for measuring a temperature indicative of an instant temperature of intake air cooled in the CAC.

10. The engine system of claim 6 wherein the regeneration control unit further includes executable instructions stored on the memory to adjust the position of the boost leakage valve where the count of the timer satisfies a count threshold.

11. The engine system of claim 10 wherein the count threshold includes a first count threshold, and wherein the regeneration control unit further includes executable instructions stored on the memory to increase an engine speed where the count of the timer satisfies a second count threshold.

12. The engine system of claim 11 wherein the second count threshold is lower than the first count threshold.

13. The engine system of claim 12 wherein the regeneration control unit further includes executable instructions stored on the memory to initiate engine shutdown where the count of the timer satisfies a shutdown count threshold that is greater than the first count threshold.

14. A method of regenerating an oxidation catalyst (DOC) in an exhaust system of an internal combustion engine comprising:

producing a temperature signal indicative of an exhaust inlet temperature of the DOC that is below a regeneration temperature for accumulated hydrocarbons on the DOC via a temperature sensor; and via a regeneration control unit:

commanding an adjustment to a position of a boost leakage valve of the internal combustion engine based on the temperature signal;

increasing an exhaust temperature of the internal combustion engine to the regeneration temperature based on an air-fuel ratio (AFR) that is relatively richer with respect to fuel and produced in response to the position of the boost leakage valve having been adjusted; and incrementing a timer, based on the instant exhaust inlet temperature of the DOC.

15. The method of claim 14 wherein the incrementing of the timer includes incrementing the timer at a counting speed based on the exhaust inlet temperature of the DOC.

16. The method of claim 15 wherein the commanding of the adjustment to the position of the boost leakage valve includes commanding the adjustment where a count of the timer satisfies a count threshold.

17. The method of claim 16 further comprising:

via the regeneration control unit:

commanding an increased engine speed where the count of the timer satisfies a second count threshold; and allocating a burden of increasing the exhaust temperature to the regeneration temperature between an increased amount of leaked boost and the increased engine speed.

* * * * *